United States Patent
Alano et al.

(10) Patent No.: US 10,190,465 B2
(45) Date of Patent: Jan. 29, 2019

(54) INSULATED COVER FOR MIXER ASSEMBLY

(71) Applicant: Faurecia Emissions Control Technologies, USA, LLC, Columbus, IN (US)

(72) Inventors: Eduardo Alano, Columbus, IN (US); Chris Chapman, Columbus, IN (US); Philip M. Dimpelfeld, Columbus, IN (US); Edward Kinnaird, Columbus, IN (US); Robin Willats, Columbus, IN (US); Eric Nicole, Columbus, IN (US); Tony Parrish, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 79 days.

(21) Appl. No.: 15/315,159

(22) PCT Filed: Jun. 5, 2014

(86) PCT No.: PCT/US2014/041013
§ 371 (c)(1),
(2) Date: Nov. 30, 2016

(87) PCT Pub. No.: WO2015/187162
PCT Pub. Date: Dec. 10, 2015

(65) Prior Publication Data
US 2017/0167344 A1    Jun. 15, 2017

(51) Int. Cl.
| | |
|---|---|
| *F01N 3/00* | (2006.01) |
| *F01N 3/28* | (2006.01) |
| *F01N 3/08* | (2006.01) |
| *F01N 3/10* | (2006.01) |
| *F01N 3/20* | (2006.01) |

(Continued)

(52) U.S. Cl.
CPC ........... *F01N 3/2892* (2013.01); *F01N 3/021* (2013.01); *F01N 3/08* (2013.01); *F01N 3/103* (2013.01);
(Continued)

(58) Field of Classification Search
USPC ......... 60/274, 286, 295, 297, 301, 303, 322, 60/324, 272
See application file for complete search history.

(56) References Cited

U.S. PATENT DOCUMENTS

| | | |
|---|---|---|
| 9,145,810 B2 | 9/2015 | Bisaiji et al. |
| 9,364,790 B2 * | 6/2016 | Sampath ............... B01F 5/0451 |

(Continued)

FOREIGN PATENT DOCUMENTS

| | | |
|---|---|---|
| DE | 202007010435 U1 | 11/2007 |
| EP | 2233708 A1 | 9/2010 |

(Continued)

OTHER PUBLICATIONS

Supplementary European Search Report for European Application No. 14894114.9 dated Nov. 21, 2017.
(Continued)

*Primary Examiner* — Binh Q Tran
(74) *Attorney, Agent, or Firm* — Carlson, Gaskey & Olds, P.C.

(57) ABSTRACT

A vehicle exhaust component assembly includes a first exhaust component, a second exhaust component downstream of the first exhaust component, and an injection system configured to inject a reducing agent into engine exhaust gases upstream of the second exhaust component. A mixer connects an outlet of the first exhaust component to an inlet to the second exhaust component. The mixer includes an outer housing that is configured to direct a mixture of the reducing agent and the engine exhaust gases into the second (Continued)

exhaust component. The mixer also includes at least one insulation feature that is configured to reduce heat lost at the outer housing.

28 Claims, 7 Drawing Sheets

(51) Int. Cl.
  *F01N 3/021* (2006.01)
  *F01N 13/14* (2010.01)
  *F01N 13/00* (2010.01)
(52) U.S. Cl.
  CPC ......... *F01N 3/2066* (2013.01); *F01N 13/009* (2014.06); *F01N 13/14* (2013.01); *F01N 13/141* (2013.01); *F01N 13/143* (2013.01); *F01N 2240/20* (2013.01); *F01N 2250/02* (2013.01); *F01N 2470/22* (2013.01); *F01N 2510/068* (2013.01); *F01N 2610/02* (2013.01); *Y02A 50/2325* (2018.01); *Y02T 10/24* (2013.01)

(56) References Cited

U.S. PATENT DOCUMENTS

| | | | | |
|---|---|---|---|---|
| 9,441,522 | B2* | 9/2016 | Crandell | ............... F01N 3/2066 |
| 9,464,546 | B2 | 10/2016 | Perrot et al. | |
| 9,849,424 | B2* | 12/2017 | Davidson | ............ B01D 53/9495 |
| 9,920,676 | B2* | 3/2018 | Freeman | ................ F01N 3/2892 |
| 2001/0018826 | A1 | 9/2001 | Rusch | |
| 2009/0084094 | A1 | 4/2009 | Goss et al. | |
| 2010/0196225 | A1 | 8/2010 | Harinath et al. | |
| 2010/0300080 | A1 | 12/2010 | Peters et al. | |
| 2011/0079003 | A1* | 4/2011 | Sun | ........................ F01N 3/2066 60/310 |
| 2013/0164181 | A1 | 6/2013 | Iijima et al. | |
| 2013/0303365 | A1 | 11/2013 | Yin et al. | |
| 2014/0086802 | A1 | 3/2014 | Werni et al. | |

FOREIGN PATENT DOCUMENTS

| | | |
|---|---|---|
| JP | 2005155404 A | 6/2005 |
| KR | 1020130086287 A | 4/2010 |
| WO | 2010088208 A2 | 8/2010 |

OTHER PUBLICATIONS

International Preliminary Report on Patentability for International Application No. PCT/US2014/041013 dated Dec. 15, 2016.
PCT Search Report dated Feb. 12, 2015.
Korean Office Action for Korean Patent Application No. 10-2017-7000022, dated Jul. 11, 2018.

* cited by examiner

INSULATED COVER FOR MIXER ASSEMBLY

TECHNICAL FIELD

The subject invention relates to a vehicle exhaust system that includes a mixer assembly with an insulated cover to reduce deposit formation by minimizing heat loss.

BACKGROUND OF THE INVENTION

An exhaust system conducts hot exhaust gases generated by an engine through various exhaust components to reduce emissions and control noise. The exhaust system includes an injection system that injects a reducing agent, such as a solution of urea and water for example, upstream of a selective catalytic reduction (SCR) catalyst. A mixer is positioned upstream of the SCR catalyst and mixes engine exhaust gases and products of urea transformation.

In one example configuration, the mixer connects an upstream exhaust component such as a diesel oxidation catalyst (DOC) and/or a diesel particulate filter (DPF) to the SCR catalyst. A doser typically sprays the urea into the exhaust stream upstream of the SCR catalyst. In one known configuration, the doser is mounted to an outer peripheral surface of the mixer and is configured to direct the spray into an exhaust gas stream; however, these known spray configurations can result in increased urea deposit formation, which is undesirable.

SUMMARY OF THE INVENTION

In one exemplary embodiment, a vehicle exhaust component assembly includes a first exhaust component, a second exhaust component downstream of the first exhaust component, and an injection system configured to inject a reducing agent into engine exhaust gases upstream of the second exhaust component. A mixer connects an outlet of the first exhaust component to an inlet to the second exhaust component. The mixer includes an outer housing that is configured to direct a mixture of the reducing agent and the engine exhaust gases into the second exhaust component. The mixer also includes at least one insulation feature that is configured to reduce heat lost at the outer housing.

In a further embodiment of the above, the at least one insulation feature comprises at least one of an insulation material provided on the outer housing, a coating applied to the outer housing, and a spray foam applied to the outer housing.

In a further embodiment of any of the above, the mixer includes an inner wall spaced from an inner surface of the outer housing, the inner wall directing at least a portion of the mixture of the reducing agent and engine exhaust gases into the second exhaust component.

In a further embodiment of any of the above, the inner wall is supported relative to the outer housing by at least one piece of insulating material.

In a further embodiment of any of the above, the inner wall is spaced from the inner surface of the outer housing to split an exhaust gas flow path into a first path that is inboard of the inner wall and a second portion that is outboard of the inner wall, and wherein the at least one insulation feature comprises exhaust gases flowing through the first path to heat the inner wall.

In a further embodiment of any of the above, the first path receives approximately 95% of the engine exhaust gases exiting the first exhaust component and the second path receives approximately 5% of the engine exhaust gases exiting the first exhaust component.

In another exemplary embodiment, a vehicle exhaust component assembly includes a first exhaust component comprising at least one of a DPF or DOC, a SCR catalyst downstream of the first exhaust component, and an injection system including a doser configured to inject a reducing agent into engine exhaust gases upstream of the SCR catalyst. A mixer connects an outlet of the first exhaust component to an inlet to the SCR catalyst. The mixer includes an outer housing that is configured to direct a mixture of the reducing agent and the engine exhaust gases into the second exhaust component, and the mixer includes at least one insulation feature that is configured to reduce heat lost at the outer housing.

In a further embodiment of any of the above, the doser is mounted to the outer housing at a doser boss.

These and other features of this application will be best understood from the following specification and drawings, the following of which is a brief description.

DETAILED DESCRIPTION

Figure 1:
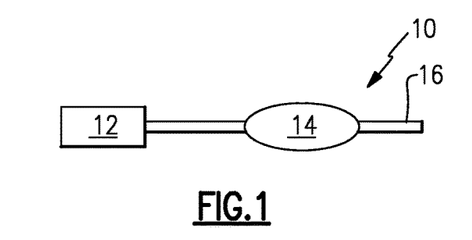
FIG. 1 schematically illustrates one example of an exhaust system component with a mixer assembly according to the subject invention.

FIG. 1 shows a vehicle exhaust system 10 that conducts hot exhaust gases generated by an engine 12 through various exhaust components 14 to reduce emission and control noise as known. The various exhaust components 14 can include diesel oxidation catalysts (DOC), selective catalytic reduction (SCR) catalysts, diesel particulate filters (DPFs), mufflers, exhaust pipes, etc. These components 14 can be mounted in various different configurations and combinations dependent upon vehicle application and available packaging space. Engine exhaust gases go through the components 14 and exit to the atmosphere via a tailpipe 16.

Figure 2:
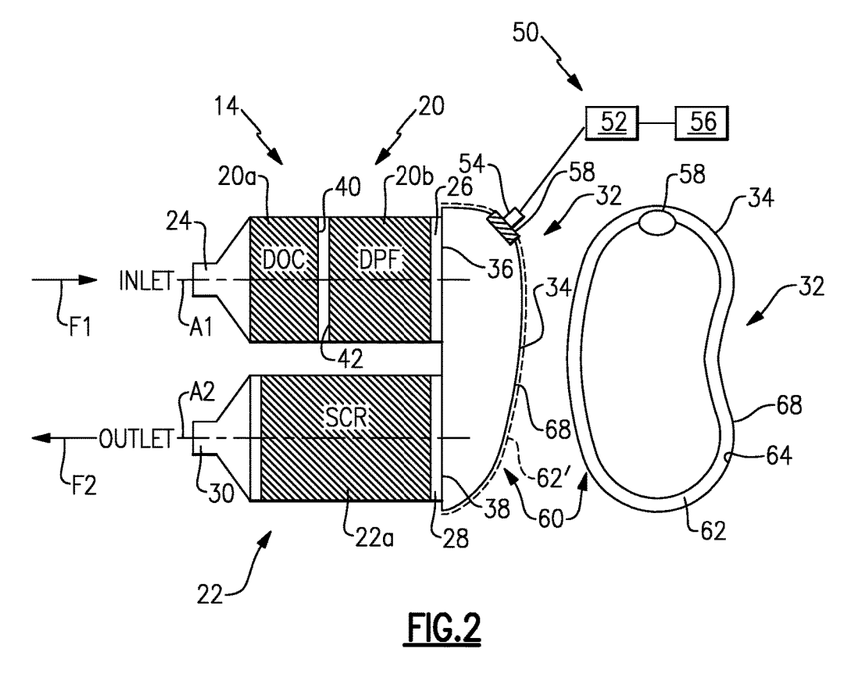
FIG. 2 is a schematic view of one example of a mixer assembly.

In one example shown in FIG. 2, the exhaust components 14 comprise a first exhaust component 20 and a second exhaust component 22 that is downstream of the first exhaust component 20. The first exhaust component 20 includes an inlet 24 that receives exhaust gases from the engine 12 or another upstream exhaust component and an outlet 26. The second exhaust component 22 includes an inlet 28, which is downstream of the outlet 26 of the first exhaust component 20, and an outlet 30. Additional components 14 could be positioned upstream of the first exhaust component 20 and/or downstream of the second exhaust component 22 as known.

A mixer 32 connects the outlet 26 of the first exhaust component 20 to the inlet 28 to the second exhaust component 22. The mixer 32 includes an outer housing 34 with a first connection interface 36 attached to the outlet 26 of the first exhaust component 20 and a second connection interface 38 attached to the inlet 28 to the second exhaust component 22. The first 36 and second 38 connection interfaces can comprise weld attachment interfaces, brazed attachment interfaces, etc., for example.

In the example shown in FIG. 2, the first exhaust component 20 defines a first central axis A1 extending along a length of the first exhaust component 20 and the second exhaust 22 component defines a second central axis A2 extending along a length of the second exhaust component 22. In this example the components 20, 22 are in a parallel orientation where the first central axis A1 is parallel to the second central axis A2. Further, the first 20 and second 22 exhaust components extend outwardly from the same side of the mixer 32. As such, engine exhaust gas flowing into the first exhaust component 20 changes from a first flow direction F1 defined along the first central axis A1 as the exhaust gases enter the mixer 32 and exit the second exhaust component 22 in a second flow direction F2 defined along the second central axis A2 and which is opposite the first flow direction F1. Thus, in this configuration, the outer housing 34 of the mixer 32 essentially comprises a common end cap cover for both the first 20 and second 22 exhaust components that has a U-shape to allow for the change of direction.

In the example shown, the first exhaust component 20 comprises a DOC 20a and a DPF 20b and the second exhaust component 22 comprises a SCR catalyst 22a. The DOC 20a includes an outlet 40 to an inlet 42 of the DPF 20b. The DPF 20b includes the outlet 26 to the mixer 32 which directs the exhaust gases into the inlet 28 of the SCR catalyst 22a. It should be understood that this is just one example configuration, the first exhaust component 20 may include only one of the DOC 20a and DPF 20b, or the first exhaust component 20 may include another type of exhaust component(s) and/or may include additional exhaust components.

An injection system 50 (FIG. 2) is used to inject a reducing agent, such as a solution of urea and water for example, into the exhaust gas stream upstream from the SCR catalyst 22a such that the mixer 32 can mix the urea and exhaust gas thoroughly together. The injection system 50 includes a fluid supply 52, a doser 54, and a controller 56 that controls injection of the urea as known. In one example, the doser 54 is mounted to the outer housing 34 of the mixer 32 via a doser boss 58 that defines an opening into an interior of the mixer 32. In one example, the opening for the doser boss 58 is positioned just downstream of the outlet 26 and near an upstream portion of the outer housing 34 such that urea is sprayed into the exhaust gas flow at a location that is well upstream of the inlet 28 to the SCR catalyst 22a. The doser 54 could also be located at other positions along the outer housing 34 depending upon packaging constraints.

In the example shown in FIG. 2, the outer housing 34 of the mixer 32 is configured to direct a mixture of the reducing agent and the engine exhaust gases into the second exhaust component 22. The mixer 32 includes at least one insulation feature 60 that is configured to reduce heat lost at the outer housing 34. By reducing heat loss at the mixer 32, the risk of urea deposit formation is significantly reduced and mixing efficiency is improved.

In the example shown in FIG. 2, the at least one insulation feature 60 comprises an insulation material 62 that is provided on the outer housing 34. Any type of insulation material for exhaust systems could be associated with the outer housing 34. Examples of insulating materials include, for example, Silcosoft® made by BGF Industries, Ecoflex® made by Unifrax, and Interam® made by 3M; however, other appropriate insulating materials may also be used. In one example, the insulation material 62 is applied to an inner surface 64 of the outer housing 34. Optionally, the insulation material 62' could be applied externally of the outer housing 34.

Figure 3:
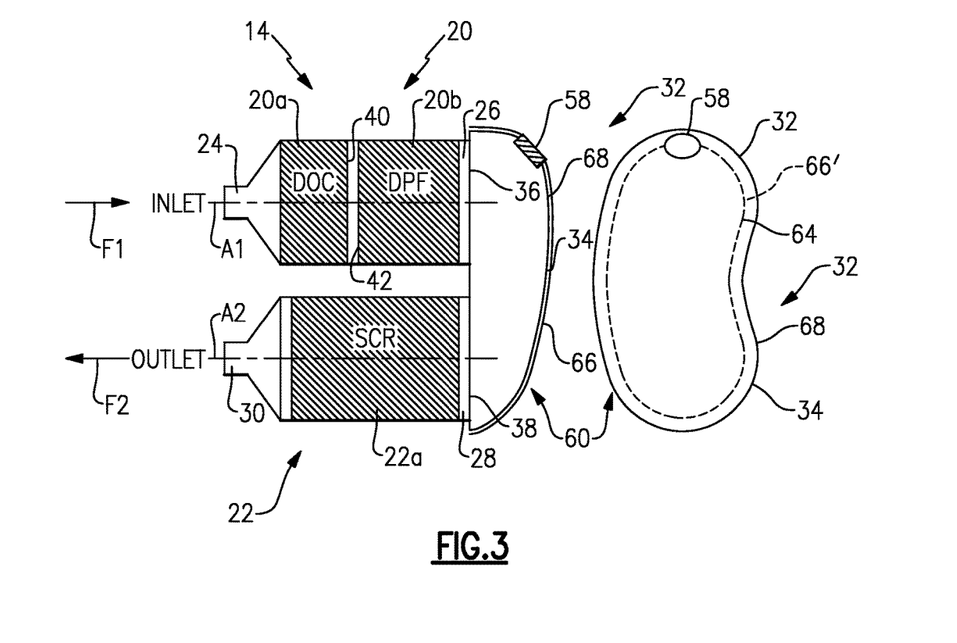
FIG. 3 is a schematic view of another example of a mixer assembly.

In the example shown in FIG. 3, the at least one insulation feature 60 comprises a coating 66 that is applied on the outer housing 34. In one example, the coating 66 is applied to an outer surface 68 of the outer housing 34. The coating 66' could also be applied to the inner surface 64 of the outer housing 34 in addition to application on the outer surface 68, or instead of being applied to the outer surface 68. In one example, the coating 66 is comprised of an organic paint with properties sufficient to withstand high temperatures.

Figure 4:
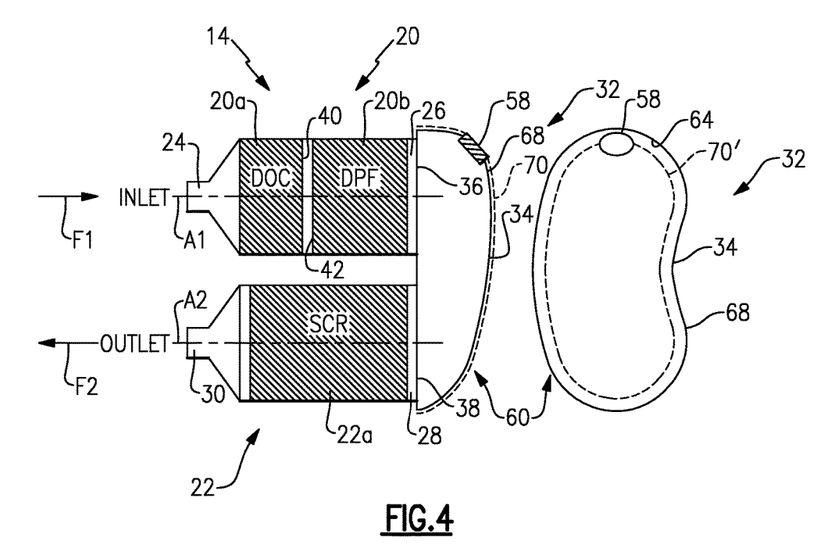
FIG. 4 is a schematic view of another example of a mixer assembly.

In the example shown in FIG. 4, the at least one insulation feature 60 comprises a spray foam 70 that is applied on the outer housing 34. In one example, the spray foam 70 is applied to the outer surface 68 of the outer housing 34. The spray foam 70' could also be applied to the inner surface 64 of the outer housing 34 in addition to application on the outer surface 68, or instead of being applied to the outer surface 68. In one example, the spray foam 70 is comprised of a spray foam insulation material with properties sufficient to withstand high temperatures. An example of a foam material is, for example, Zircofoam made by Z.G. CAMINI INOX SRL; however, other appropriate foam materials may also be used.

Figure 5:
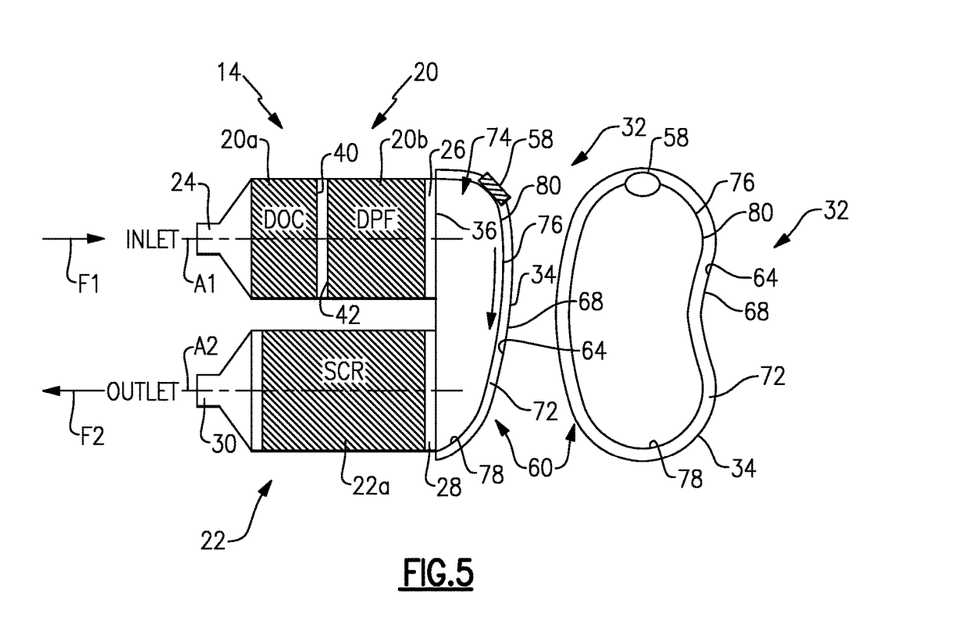
FIG. 5 is a schematic view of another example of a mixer assembly.

In the example shown in FIG. 5, the at least one insulation feature 60 comprises an air gap 72 that is provided within an interior 74 of the outer housing 34. In this example, the mixer 32 includes an inner wall 76 that is spaced from the inner surface 64 of the outer housing 34. The inner wall 76 has an inner surface 78 that directs at least a portion of the mixture of the reducing agent and engine exhaust gases into the second exhaust component 22. In this example, the air gap 72 is formed between the inner surface 64 of the outer housing 34 and an outer surface 80 of the inner wall 76. The air gap 72 is an insulating air gap that does not receive exhaust gases exiting the first exhaust component 20. Thus, the entire mixture of the reducing agent and engine exhaust gases is directed along the inner surface 78 of the inner wall 76.

Figure 6:
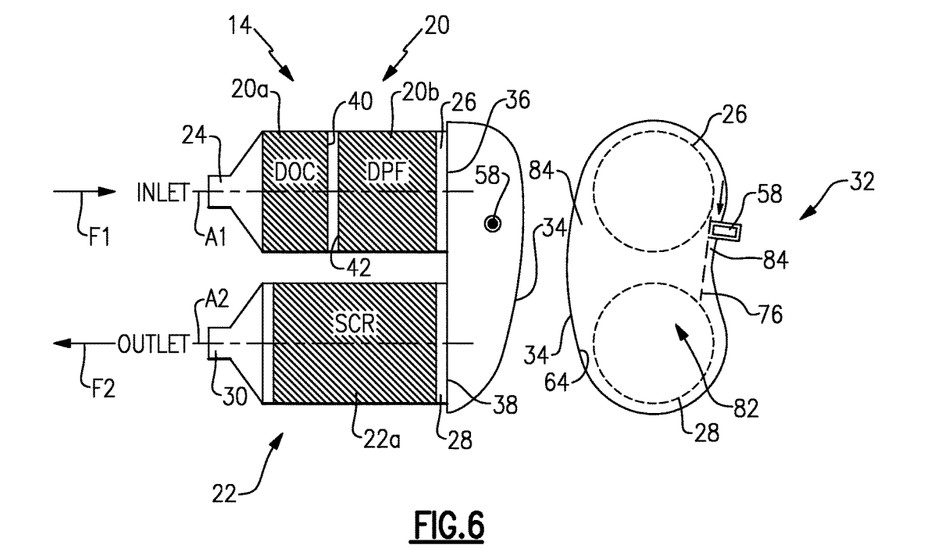
FIG. 6 is a schematic view of another example of a mixer assembly.

In the example shown in FIG. 6, the inner wall 76 is spaced from the inner surface 64 of the outer housing 34 to split the exhaust gas flow path into a first path 82 that is inboard of the inner wall 76 and a second path 84 that is outboard of the inner wall 76. The at least one insulation feature in this example configuration comprises exhaust gases flowing through the first path 82 to heat the inner wall 76 to reduce deposit formation. In one example, the first path 82 receives approximately 95% of the engine exhaust gases exiting the first exhaust component 20 and the second path 84 receives approximately 5% of the engine exhaust gases exiting the first exhaust component 20.

Figure 7:
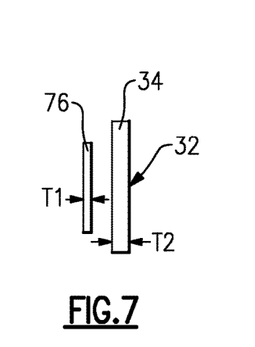
FIG. 7 is a schematic view of another example of a mixer assembly.

In the example shown in FIG. 7, the inner wall 76 has a thickness T1 that is less than a thickness T2 of the outer housing 34. This provides a configuration where the inner wall 76 comprises a low thermal inertia inner shell made from a thinner material for earlier light off in combination with a thicker structural outer housing 34. In this configuration there could also be an optional 25%/75% flow split. Further, this configuration could be used in any of the embodiments that utilize an inner wall 76.

Figure 8:
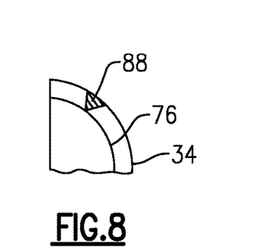
FIG. 8 is a schematic view of another example of a mixer assembly.

In the example shown in FIG. 8, the inner wall 76 is supported relative to the outer housing 34 by at least one piece of insulating material 88. Any type of insulating material can be used in this configuration. Examples of appropriate insulating materials include, for example, Silcosoft® made by BGF Industries, Ecoflex® made by Unifrax, and Interam® made by 3M; however, other appropriate insulating materials may also be used.

Figure 9A:
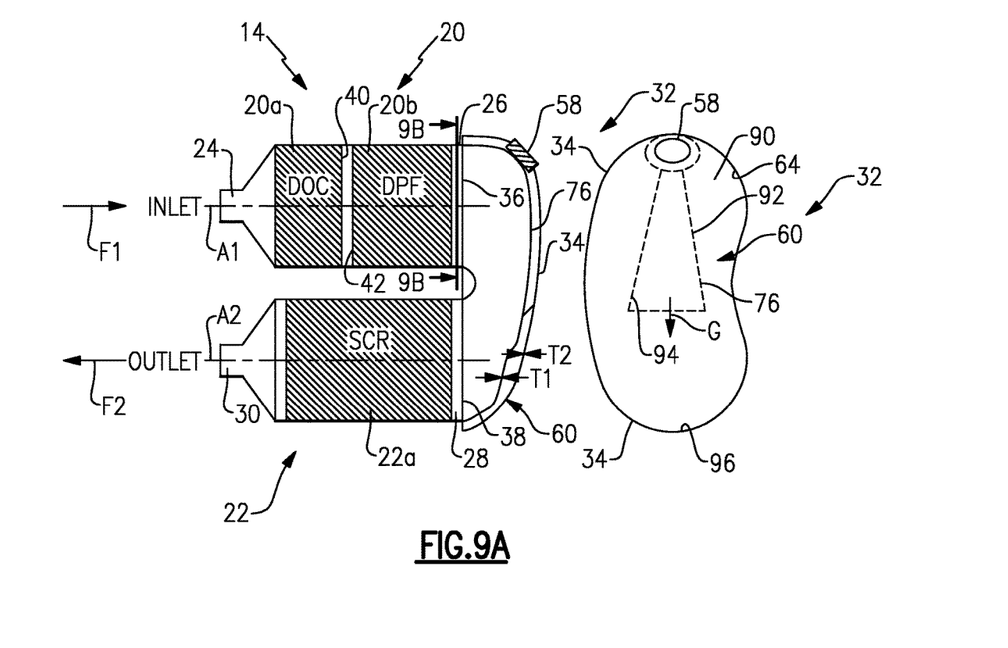
FIG. 9A is a schematic view of another example of a mixer assembly.
Figure 9B:
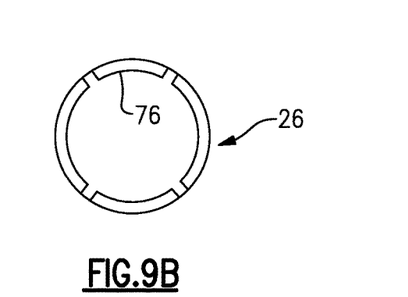
FIG. 9B is a section view as identified in FIG. 9A.

In the example shown in FIGS. 9A-9B, the inner wall 76 is spaced from the inner surface 64 of the outer housing 34 by an air gap 90. The inner wall 76 provides a surface 92 directs a substantial amount of the mixture of the reducing agent and engine exhaust gases into the second exhaust component 22. The inner wall 76 includes at least one portion 94 to define at least one additional gas path G directed to a predetermined area 96 of the outer housing 34 to increase heat at the predetermined area 96. This configuration can be used to heat certain areas that are determined to be prone to deposit formation.

Further, as shown in FIG. 9A, the inner wall 76 can have variable spacing from the outer housing 34, and can have a smaller thickness T1 than a thickness T2 of the outer housing 34 as discussed above.

FIG. 9B, shows that at the outlet 26 of the first exhaust component 20, the inner wall 76 limits inner skin to outer skin interaction to reduce thermal conductivity.

Figure 10:
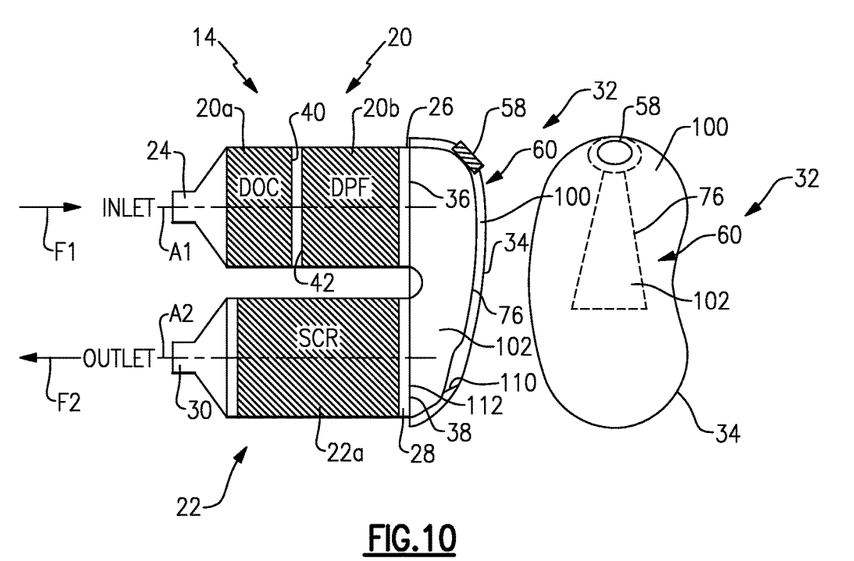
FIG. 10 is a schematic view of another example of a mixer assembly.

In the example shown in FIG. 10, the inner wall 76 is spaced from the outer housing 34 to define an outer cavity 100 and an inner cavity 102. The doser boss 58 is formed within the outer housing 34 and is positioned along the outer housing 34 such that engine exhaust gas flowing into the outer cavity 100 heats the doser boss 58. This reduces deposit formation about a tip of the doser 54 (FIG. 2).

Also shown in the example of FIG. 10, the inner wall 76 is configured such that flow from the first cavity 100 is directed by a wall portion 110 toward a predetermined area 112 of an inlet face of the second exhaust component 22. This allows flow through the outer cavity 100 to be re-injected towards certain areas of the SCR catalyst inlet face where ammonia concentration tends to be higher than necessary. This results in a more uniform distribution of the mixture of reducing agent and exhaust gases across the inlet face. In this example, the outlet 26 can be configured similarly to that of FIG. 9A.

Mounting orientations of the components 20, 22 can vary due to vehicle size and type. It should be understood that the parallel configuration shown in the figures is just one example configuration, and that the subject mixer assembly could be utilized with components that are mounted in other mounting configurations.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust component assembly comprising:
   a first exhaust component;
   a second exhaust component downstream of the first exhaust component;
   an injection system configured to inject a reducing agent into engine exhaust gases upstream of the second exhaust component; and
   a mixer connecting an outlet of the first exhaust component to an inlet to the second exhaust component, the mixer comprising an outer housing that is configured to direct a mixture of the reducing agent and the engine exhaust gases into the second exhaust component, and wherein the outer housing comprises an enclosed end and an open end opposite the enclosed end, the open end including both a connection to the outlet of the first exhaust component and the inlet to the second exhaust component such that the outer housing comprises a common end cap cover for both the first and second exhaust components, and wherein the outer housing has an injection opening for the injection system that is in an upstream portion of the outer housing such that the injection opening faces the outlet of the first exhaust component, and the mixer including at least one insulation feature that is configured to reduce heat lost at the outer housing.

2. The vehicle exhaust component assembly according to claim 1 wherein the outer housing has a U-shape, and including a boss located on the outer housing adjacent the outlet of the first exhaust component, and wherein the boss defines the injection opening which is configured to receive a doser that injects the reducing agent into the engine exhaust gases.

3. The vehicle exhaust component assembly according to claim 1 wherein the at least one insulation feature comprises insulation material provided on the outer housing.

4. The vehicle exhaust component assembly according to claim 1 wherein the at least one insulation feature comprises a coating applied on the outer housing.

5. The vehicle exhaust component assembly according to claim 1 wherein the at least one insulation feature comprises a spray foam applied to the outer housing.

6. The vehicle exhaust component assembly according to claim 1 wherein the mixer includes an inner wall spaced from an inner surface of the outer housing, the inner wall directing at least a portion of the mixture of the reducing agent and engine exhaust gases into the second exhaust component.

7. The vehicle exhaust component assembly according to claim 6 wherein the inner wall has a thickness that is less than a thickness of the outer housing.

8. The vehicle exhaust component assembly according to claim 6 wherein the inner wall is supported relative to the outer housing by at least one piece of insulating material.

9. The vehicle exhaust component assembly according to claim 6 wherein the inner wall is spaced from the inner surface of the outer housing by an insulating air gap, the inner wall providing a surface to direct the entire mixture of the reducing agent and engine exhaust gases into the second exhaust component, and wherein the at least one insulation feature comprises the insulating air gap.

10. A vehicle exhaust component assembly comprising:
    a first exhaust component;
    a second exhaust component downstream of the first exhaust component;
    an injection system configured to inject a reducing agent into engine exhaust gases upstream of the second exhaust component; and
    a mixer connecting an outlet of the first exhaust component to an inlet to the second exhaust component, the mixer comprising an outer housing that is configured to direct a mixture of the reducing agent and the engine exhaust gases into the second exhaust component, the mixer including at least one insulation feature that is configured to reduce heat lost at the outer housing, and wherein the mixer includes an inner wall spaced from an inner surface of the outer housing, the inner wall directing at least a portion of the mixture of the reducing agent and engine exhaust gases along a gas path into the second exhaust component, and wherein the inner wall is spaced from an inner surface of the outer housing by an air gap, the inner wall providing a surface to direct a substantial amount of the mixture of the reducing agent and engine exhaust gases into the second exhaust component, and including at least one additional gas path directed to a predetermined area of the outer housing to increase heat at the predetermined area, and wherein the at least one insulation feature comprises the insulating air gap.

11. A vehicle exhaust component assembly comprising:
a first exhaust component;
a second exhaust component downstream of the first exhaust component;
an injection system configured to inject a reducing agent into engine exhaust gases upstream of the second exhaust component; and
a mixer connecting an outlet of the first exhaust component to an inlet to the second exhaust component, the mixer comprising an outer housing that is configured to direct a mixture of the reducing agent and the engine exhaust gases into the second exhaust component, the mixer including at least one insulation feature that is configured to reduce heat lost at the outer housing, and wherein the mixer includes an inner wall spaced from an inner surface of the outer housing, the inner wall directing at least a portion of the mixture of the reducing agent and engine exhaust gases into the second exhaust component, and wherein the inner wall is spaced from the inner surface of the outer housing to split an exhaust gas flow path into a first flow path that is inboard of the inner wall and a second flow path that is outboard of the inner wall, and wherein the at least one insulation feature comprises exhaust gases flowing through the first flow path to heat the inner wall.

12. The vehicle exhaust component assembly according to claim 11 wherein the first flow path receives approximately 95% of the engine exhaust gases exiting the first exhaust component and the second flow path receives approximately 5% of the engine exhaust gases exiting the first exhaust component.

13. The vehicle exhaust component assembly according to claim 11 including a doser boss formed within the outer housing and positioned along the outer housing such that engine exhaust gas flowing into the first flow path heats the doser boss.

14. The vehicle exhaust component assembly according to claim 11 wherein flow through the first flow path is directed toward a predetermined area of an inlet face of the second exhaust component.

15. The vehicle exhaust component assembly according to claim 1 wherein the second exhaust component comprises an SCR catalyst.

16. The vehicle exhaust component assembly according to claim 1 wherein the first exhaust component comprises at least one of a DPF and DOC.

17. A vehicle exhaust component assembly comprising:
a first exhaust component comprising at least one of a DPF or DOC;
a SCR catalyst downstream of the first exhaust component;
an injection system including a doser configured to inject a reducing agent into engine exhaust gases upstream of the SCR catalyst; and
a mixer connecting an outlet of the first exhaust component to an inlet to the SCR catalyst, the mixer comprising an outer housing that is configured to direct a mixture of the reducing agent and the engine exhaust gases into the second exhaust component, and wherein the outer housing comprises an enclosed end and an open end opposite the enclosed end, the open end including both a connection to the outlet of the first exhaust component and the inlet to the second exhaust component such that the outer housing comprises a common end cap cover for both the first and second exhaust components, and wherein the outer housing has a doser opening for the doser that is in an upstream portion of the outer housing such that the doser opening faces the outlet of the first exhaust component, and the mixer including at least one insulation feature that is configured to reduce heat lost at the outer housing.

18. The vehicle exhaust component assembly according to claim 17 wherein the doser is mounted to the outer housing at a doser boss that defines the doser opening.

19. The vehicle exhaust component assembly according to claim 17 wherein the at least one insulation feature comprises at least one of an insulation material provided on the outer housing, a coating applied to the outer housing, and a spray foam applied to the outer housing.

20. The vehicle exhaust component assembly according to claim 17 wherein the mixer includes an inner wall spaced from an inner surface of the outer housing, the inner wall directing at least a portion of the mixture of the reducing agent and engine exhaust gases into the second exhaust component, and wherein the at least one insulation feature comprises at least a portion of a space formed between the inner wall and outer housing.

21. The vehicle exhaust component assembly according to claim 10 wherein the outer housing has an injection opening for the injection system that is in an upstream portion of the outer housing such that the injection opening faces the outlet of the first exhaust component.

22. The vehicle exhaust component assembly according to claim 10 wherein the outer housing comprises an enclosed end and an open end opposite the enclosed end, the open end including both a connection to the outlet of the first exhaust component and the inlet to the second exhaust component such that the outer housing comprises a common end cap cover for both the first and second exhaust components.

23. The vehicle exhaust component assembly according to claim 11 wherein the outer housing has an injection opening for the injection system that is in an upstream portion of the outer housing such that the injection opening faces the outlet of the first exhaust component.

24. The vehicle exhaust component assembly according to claim 11 wherein the outer housing comprises an enclosed end and an open end opposite the enclosed end, the open end including both a connection to the outlet of the first exhaust component and the inlet to the second exhaust component such that the outer housing comprises a common end cap cover for both the first and second exhaust components.

25. A vehicle exhaust component assembly comprising:
a first exhaust component;
a second exhaust component downstream of the first exhaust component;

an injection system configured to inject a reducing agent into engine exhaust gases upstream of the second exhaust component; and a mixer connecting an outlet of the first exhaust component to an inlet to the second exhaust component, the mixer comprising an outer housing that is configured to direct a mixture of the reducing agent and the engine exhaust gases into the second exhaust component, and wherein the outer housing comprises an enclosed end and an open end opposite the enclosed end, the open end including both a connection to the outlet of the first exhaust component and the inlet to the second exhaust component such that the outer housing comprises a common end cap cover for both the first and second exhaust components, and wherein the outer housing has an injection opening for the injection system that is in an upstream portion of the outer housing, and an inner wall spaced from an inner surface of the outer housing to provide a first exhaust gas flow path that is inboard of the inner wall and a second exhaust gas flow path that is outboard of the inner wall.

26. The vehicle exhaust component assembly according to claim 25 wherein the first exhaust gas flow path comprises a primary flow path that directs a majority of the mixture of the reducing agent and engine exhaust gases into the second exhaust component and the second exhaust gas flow path comprises a secondary flow path that directs a portion of exhaust gas into an air gap between the outer housing and inner wall.

27. The vehicle exhaust component assembly according to claim 26 wherein the injection system includes a doser boss that defines an opening in the outer housing that opens into the air gap.

28. The vehicle exhaust component assembly according to claim 27 wherein the inner wall is configured such that flow is directed by a wall portion of the inner wall toward a predetermined area of an inlet face of the second exhaust component such that flow from the second exhaust gas flow path is re-injected towards the inlet face.

* * * * *